United States Patent [19]

Berler

[11] 3,774,014

[45] Nov. 20, 1973

[54] PRINTED CODE SCANNING SYSTEM

[75] Inventor: Robert M. Berler, Westport, Conn.

[73] Assignee: Pitney Bowes-Alpex, Inc., Danbury, Conn.

[22] Filed: Mar. 20, 1972

[21] Appl. No.: 236,391

Related U.S. Application Data

[63] Continuation-in-part of Ser. No. 211,296, Dec. 23, 1971, abandoned.

[52] U.S. Cl. .................... 235/61.11 E, 250/219 CD
[51] Int. Cl. .......................... G06k 7/10, E04g 17/00
[58] Field of Search ................ 235/61.11 E, 61.7 B, 235/61.6 A, 61.6 B; 250/219 CD; 315/5.24

[56] References Cited

UNITED STATES PATENTS

| | | | |
|---|---|---|---|
| 3,246,126 | 4/1966 | Schlieben et al. | 235/61.11 E |
| 2,975,965 | 3/1961 | Demer et al. | 250/219 DC |
| 3,663,800 | 5/1972 | Meyer et al. | 235/61.7 B |
| 3,609,306 | 9/1971 | Langley | 235/61.11 E |
| 3,665,164 | 5/1972 | Beveridge et al. | 235/61.7 B |
| 3,600,556 | 8/1971 | Acker | 235/61.11 E |
| 3,676,645 | 7/1972 | Fickenscher et al. | 235/61.11 E |

*Primary Examiner*—Daryl W. Cook
*Attorney*—Arthur J. Plantamura

[57] ABSTRACT

A novel data processing system especially useful at check-out counters is provided that comprises a read-out apparatus for sensing a printed code, which is placed on articles of merchandise, e.g. a binary code, which appears as an array of printed lines and spaces. The system includes a camera-type image detecting reader which may be situated at a location remote from the counter on which the merchandise is being conveyed; the camera reader comprises a suitable electronic image scanning device such as a vidicon tube or other image scanning tube which uses similar deflection means. The image scanning reader has a photosensitive area upon which an optical image is focused and functions so that the photosensitive area is scanned with a raster type sweep pattern which rotates continuously to provide electrical sampling of the optical image. Orientation means is incorporated within the reader so that regardless of the orientation of the label with the printed code to be read, the raster type sweep pattern will align itself with the coded strip to provide the desired readout. Each line of the raster represents a potential reading scan in the field into which the printed code to be read is positioned; when the rotation of the raster coincides with an entire traverse of all the bits of the printed code to be read, a readout is registered. The image scanning tube senses the variations in light intensity caused by the image of the coded marks falling on the photosensitive area as the array of marks is scanned by the raster type sweep pattern; these variations produce an electrical signal representative of the printed code. Command signals and logic circuits determine the character of the encoded digits under observation through the reader which, in addition to the image scanning tube, preferably includes a source of illumination whose light projection coincides with the field of view at the label scanning zone.

22 Claims, 9 Drawing Figures

INVENTOR.
ROBERT M. BERLER
BY:
Arthur J. Plantamura
ATTORNEY.

FIXED IMAGE, ROTATING RASTER

FIXED IMAGE, ROTATING RASTER

INVENTOR.
ROBERT M. BERLER
BY:
Arthur J. Plantamura
ATTORNEY.

ROTATING IMAGE, FIXED RASTER

INVENTOR.
ROBERT M. BERLER
BY:
Arthur J. Plantamura
ATTORNEY.

PRINTED CODE SCANNING SYSTEM

This application is a continuation-in-part of the application filed on Dec. 23, 1971, Ser. No. 211,296, now abandoned.

BACKGROUND OF THE INVENTION

This invention relates to a novel data processing system and, more particularly, to a printed bar code sensing or reading device which includes an image scanning tube having a photosensitive area upon which an optical image is focused; the photosensitive area is scanned with a raster type sweep pattern to provide electrical sampling of the optical image. By way of specific application, the invention will be described primarily by reference to a vidicon type tube, such as is used in a conventional television type camera, to scan the printed code at a location remote from the reader and in conjunction with the customer check-out operations of the kind conventionally utilized in super markets, discount houses, or other self-service retail stores. In stores where "point of sale" recorders are used in conjunction with merchandise labels, which includes tags, tickets, etc., the information on these labels is normally entered into the point of sale system manually via the keyboard of a cash register or other recording device, via a hand-held optical ticket scanning device. Both of these systems require that a minimum of two individuals be used at each check-out counter in order to achieve high customer turnover; one person operates the point of sale recorder, as well as the hand-held optical scanner, while the second person bags the merchandise after it has been recorded. It would be highly desirable if the functions performed by these two persons could be combined and accomplished by a single operator. This operator would pick up and pack, or otherwise channel, the merchandise into a bag—during this operation, i.e. as the merchandise passes a given station, the labels on the merchandise would be automatically scanned. It would, of course, be most desirable if orientation of the labels during the scanning process were unnecessary. Thus, a single operator would bag the articles as they were being automatically scanned—thereafter with the bagging operation completed, this same individual would complete the payment transaction with the customer as totals of items purchased are displayed on the register readout.

SUMMARY OF THE INVENTION

In accordance with the invention, an improved code and reader combination of a novel character is provided that largely overcomes prior art deficiencies. A particularly advantageous embodiment of the invention comprises a system and specifically an image scanner which unattended is capable of reading automatically a linear printed bar code on a label, regardless of the orientation of the array of lines and spaces, as the label passes through the field of view of the image scanner. The printed code preferably comprises a series or an array of lines and spaces of different widths wherein one or the other or both of the lines and the spacing between these lines is adjusted or varied in accordance with a desired predetermined code. A combination of lines and spaces disposed linearly with variations in the relative widths of these lines or spaces constitute a code, as for example, a binary coded decimal system. The image scanning reader scans the code reading across the widths of these lines and spaces as the label, which may be affixed to articles of merchandise, is moved across the field of vision of the reader. It is unnecessary that the bar code affixed on the merchandise label, i.e. the array of lines and spaces which comprise the code, be oriented in any particular direction as it passes within view of the reader because the raster type sweep pattern will properly orient with respect to the coded array of lines and spaces. Preferably contained within the scanner housing, or as an accessary thereto, is a light source which provides illumination for the coded indicia to be read as well as affording an outline of the scan zone area through which the coded label is passed for reading. When in use in connection with a retail store customer checkout counter, for example, the reader or scanner, may be placed above the counter in which case the labels are arranged to face upward. This will permit the light source to illuminate the bar code on the label as it passes under the field of view of the camera reader. Alternatively, the image scanner reader may be situated on one side of the merchandise conveyer or checkout counter arranged so that it scans the code on labels positioned on the side of articles which pass on the conveyor or are passed manually in front of the reader. In still another arrangement, the scanner or reader and light may be placed underneath the merchandise checkout counter. The scanner in this case reads labels placed on the bottom of articles of merchandise instead of on top. In this embodiment in which scanning takes place from the bottom up, articles are moved over a transparent surface or window, e.g. a glass panel, to enable the scanner to view the label; the window is the scanning zone in this case. A light source beneath the counter projects light through the window illuminating the bottom of the passing article which bears the label with a printed code.

A distinct advantage of this last arrangement is that the depth of field focus problems are minimized. All labels are at the same focal distance from the scanner lens. Also, for example, merchandise with a relatively broad base and a narrow upper portion, such as a bottle, may not have enought room on its top for a label, while at its base, it will be amply dimensioned to accommodate a label.

The invention is described in connection with the embodiment in which the coded label comprises a bar code in the form of lines and spaces wherein the thickness of these lines and spaces varies—this variation in thickness being used as the encoding mechanism. The line and space groupings as printed on the document are in a binary coded form. The thickness of the line or space determines a one or a zero bit in the binary code scheme. The document is decoded in logic networks to yield the encoded binary notation of various digits. A suitable binary line and space bar code, for example, is that disclosed in the copending U.S. Pat. application of N. Alpert, et al., entitled Data Processing Means with Printed Code, Ser. No. 146,044, filed on May 24, 1971. In that application, the array of printed lines of two different line thicknesses (sometimes referred to as "line width") in combination with spaces between the printed lines of two different widths, i.e. spacings, are employed to constitute the binary code. In that code, a narrower line or space width comprises either a one bit or a zero bit and the wider width is used to designate the other bit of the binary code such as the 1, 2, 4, 7 code which is comprised of combinations of "1" and "0" bits. As the image of the coded strip formed on the photosensitive target area is scanned with a raster type sweep pattern, the binary code is translated into the corresponding digit by the logic circuitry. After the label has been decoded, the desired portion of the encoded information such as the price of the item may be displayed on a cash register or other display device for viewing by the customer. Additionally, the data extracted from the coded label functions as the source for operating the cash register and/or a printer to produce a document associated with the transaction.

To enable the system to read labels in either direction, i.e. traverse the array of lines and spaces from one end or the other, a binary start-stop code such as the two out of five binary code described in the above noted co-pending application, Ser. No. 146,044, may be employed which produces a distinctive initiating signal when the code is scanned from one end of the array and a different initiating signal when scanned from the other end. This code is comprised of combinations of two out of five bits which include no mirror images thereby obviating the possibility of recording similar initiating signals. Through the systems logic and memory, the label produces the same readout independently of the scan direction; the initiating signal being utilized to indicate that the data being entered subsequent to the start or initiating signal is being scanned in a forward or reverse direction.

As noted, this system is especially useful in processing merchandise, especially in discount houses and department stores where the coded label is affixed to the merchandise and as the customer places it on the checkout counter, it passes the scanning camera which makes an entry directly into a computer for processing. Normal merchandise movement through the scanning zone will not affect read-out because of the high rate of speed of the scanning beam of the vidicon.

Typically, the coded label affixed to the article of merchandise may be printed directly on the merchandise container or it may take the form of a label that, for example, may be one inch wide and one to three inches long, depending on the number of digits which must be encoded and which may be adhesively secured to the merchandise. For example, referring to FIG. 2, the camera readable portion of the document, i.e. the code array, may conveniently consist of a band of horizontal lines and spaces of one-eighth inch to about three-eighths inch wide while the vertical length of the column may vary from about three-fourths inch to about 2½ inches long. A portion of such labels, if desired, may be used for a printout of the decoded numbers in conventional Arabic numerals or symbols adjacent to the coded line pattern equivalent. Such Arabic numerals or other human readable figures and the equivalent line code may be printed out on the tag simultaneously by the printer thus eliminating the possiblity of error in the code and in the readable number.

This invention has the distinct advantage that the document may be printed out in one color on a contrasting substrate which may be the merchandise container itself or a separate label to be adhered to the merchandise.

Some of the outstanding features of the scanner of this invention are:

1. The image scanning tube for reading the coded label provides a fast acting scan whose decoding time interval is in the order of 0.25 second or less.

2. The directional orientation of the printed linear code label to be decoded as it passes under the readout area is immaterial.

3. The scanner may be remotely situated so that there is no interference with checkout and packaging operations being performed.

4. A relatively large label readout zone is provided at the checkout counter to insure easy merchandise positioning for reading.

5. Variation in distances between the label to be read and the scanner may be accommodated so that labels affixed to the top of packages of different heights may be read while maintaining a focus consistent with the scanner resolution requirements.

6. The active scanning zone into which the label must be presented is clearly indicated.

7. The system has the capability of providing at least two or more complete scans of the code on the label to verify the accuracy of the readout.

8. A visible or an audible signal, or both, may be readily included to indicate that a label has been correctly entered into the system.

9. The scanner has a durable life, is easy to maintain, and is reasonable in cost. Although the scanner is primarily intended to read a code conventionally printed with black ink on a white substrate or background, the system is also capable of reading codes printed in contrasting colors other than black and white such as by the use of suitable color filters in the optics.

10. The scanning system is compatible with linear type printed code indicia such as the code disclosed in the earlier mentioned application, U.S. Patent application, Ser. No. 146,044.

11. The scanning system is compatable with a circular or bulls-eye type of printed code as disclosed in U.S. Pat. Nos. 2,612,994 and 3,622,758.

DESCRIPTION OF THE PREFERRED EMBODIMENT

Figure 1:
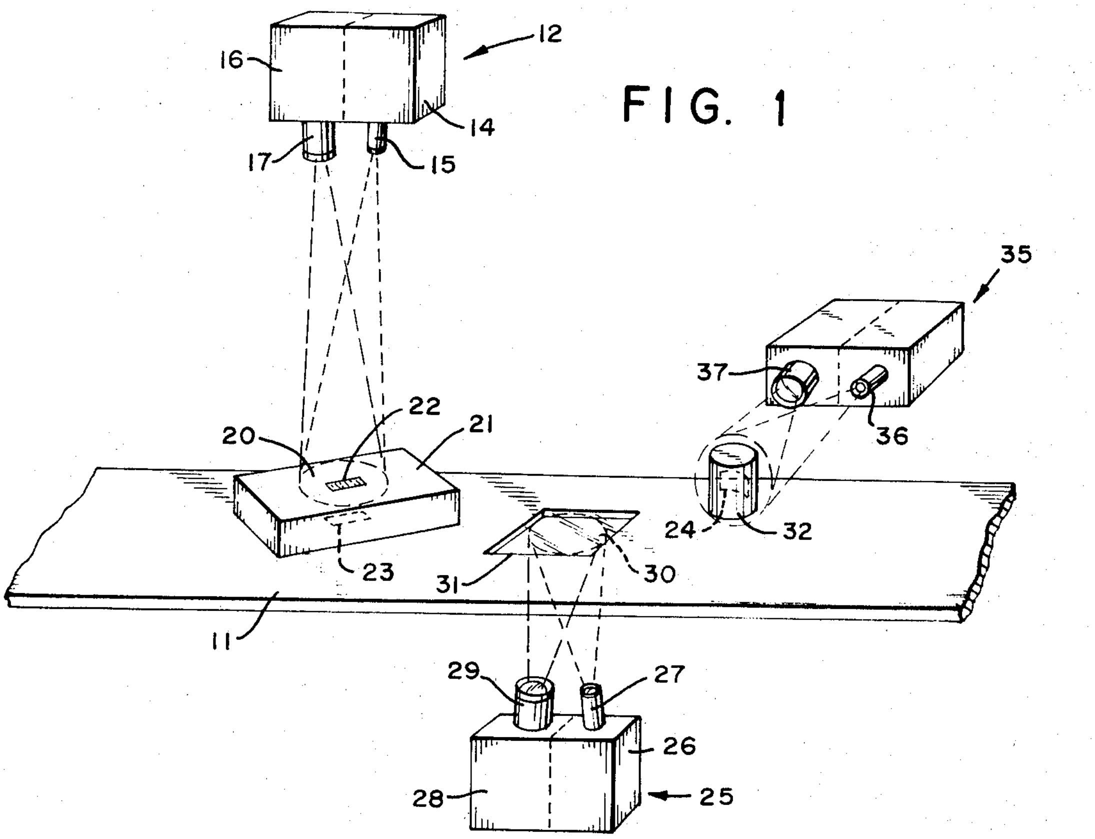
FIG. 1 is a perspective schematic view depicting the system of the invention in conjunction with a checkout counter on which merchandise carrying a coded label is passed within the view of a camera-like image scanner or reader. Three alternate label scanner positions are illustrated.

To provide better detail and to afford a fuller understanding of the novel scanning system of this invention, it will be described in conjunction with its utility at a customer checkout counter or checkout conveyor and in connection with operations normally occuring in retail sales transactions. Specifically, the system comprises a "remote automatic label scanner" hereafter sometimes referred to as RALS in conjunction with a printed bar code. In the physical embodiment, the RALS is similar in appearance, for example, to a closed circuit industrial television camera which is often used for monitoring purposes. Such devices generally comprise a box-like container with a lens as depicted in FIG. 1 suitably situated contiguous to the path of articles bearing the encoded label to be scanned. Units of this kind are devised so that no external controls or means for adjustments are necessary.

It will be understood that while the invention is described in detail by reference to a vidicon-type tube, the image scanning element of the invention is not to be construed as restricted solely to vidicon-type tubes. Other image scanning devices which are known to those skilled in the art and are available commercially may be substituted in the system of the invention, e.g. orthicon tubes or image dissector tubes.

Referring to FIG. 1, a scanner 12 may be mounted above a checkout counter 11 with its pick-up angle aimed downward at a suitable area on the counter over which merchandise will be passed. Alternatively, a scanner as illustrated by the unit 25 in FIG. 1, may be positioned below the checkout counter 11. In the latter arrangement, the checkout counter is provided with a transparent window 31 to permit a coded label placed at the bottom of articles, such as label 23 affixed to the bottom article 21, which pass over the scan area 30, to be sensed through the window portion 31 of the checkout counter surface 11. In still another arrangement, the scanner such as that shown at 35 in FIG. 1 may be situated so that it reads coded labels affixed to a vertical face of an article as it passes across the counter. In this embodiment, a label 24 positioned within a predetermined region above the base of the article of merchandise 32 and facing the vidicon scanner reader 36 would pass through the scan zone. It will be apparent that normally one scanner reader, i.e. any one of 12, 25 or 35, is sufficient to decode labels at a given station.

Referring to FIG. 1 in greater detail, it is seen that in addition to the RALS 14, the housing 12 may incorporate a projector type spotlight 16. This combination of scanner and light may be conveniently mounted above the checkout counter 11 with the light source 16 directed so that a spot of light, focused by a lens 17, will fall onto the same area 20 on the counter 11 at which the RALS 14 is aimed. The projected spot of light 20 serves two purposes: the first is to provide illumination for the coded label; the second is to designate the scanner viewing zone by making the light spot of suitable size, i.e. the sharply defined lighted circle indicates in a natural way to the operator the location of the active scanning area, so that all that is required to obtain a readout of a label is to move an article of merchandise 21 under and within the spot of light i.e. ascertaining only that the encoded array of label 22 is completely illuminated within the lighted spot 20. Within a fraction of a second, an audio and/or visual signal will indicate that the coded label 22 borne by the article of merchandise has been scanned and entered into the point-of-sale computerized recording system. The operator then performs the necessary subsequent steps such as placing the article in a shopping bag; in a similar manner the next article as processed in sequence so that the label thereon is fully within the light area 20 and the procedure is repeated until the order is completed. The scanner units 25 and 35 function similarly. With respect to the use of the image scanning unit 25 which is located under a counter surface 11, articles of merchandise are positioned, with the coded label affixed thereon, facing down as they pass over the transparent window 31 through which the encoded labels are scanned. A label (not shown) which is passed over zone 30 is illuminated by a light 28 focused by lens 29 and detected by the code scanner 26 through lens 27. It will be apparent that the "window" readout area which may be formed on glass or other transparent material is to be kept essentially clean of dust and other debris to assure a reliable readout and when it becomes scratched or marred, it should be replaced to avoid interference with accurate readout. The unit 35 illustrates that the coded label 24 passing over counter 11 may be affixed to the side of the article package 32 illuminated by light focused through lens 37 and detected by the scanner through lens 36.

Figure 2:
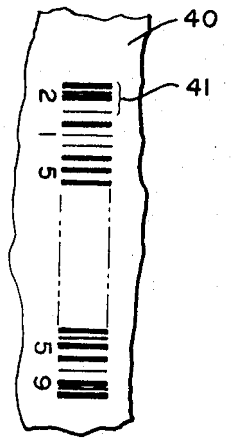
FIG. 2 is an illustrative representation of a coded label which may be printed on the merchandise container directly or on a ticket or other document and which comprises an assemblage of lines and spaces representative of a binary code.
Figure 5:
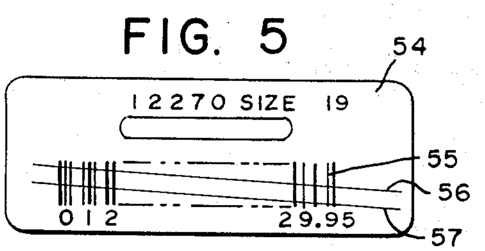
FIG. 5 depicts a label in the process of being scanned, illustrating the raster lines superimposed on the array (of bars and spaces comprising the code) which is formed on the photosensitive target area.
Figure 6:
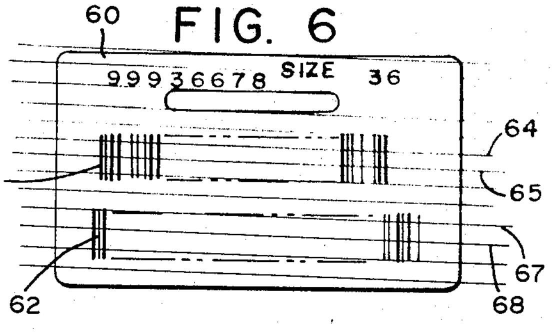
FIG. 6 is a representation similar to FIG. 5 illustrating that more than one coded band on a label may be decoded at essentially the same time.

In FIG. 2 a fragmentary segment 40 of a coded label with a portion of the printed line-space binary code is illustrated. The code format, the details of which are disclosed in the above mentioned co-pending U.S. application Ser. No. 146,044, consists essentially of a combination of lines and spaces of two sets; one set, i.e. a line and space, being a first substantially uniform transverse width or thickness and the second set being also of substantially uniform transverse width or thickness but different from the first. One width size whether a line or a space represents a "one" bit of the binary code and the second width size represents a "zero" bit of the binary code. A combination 41 of these lines and spaces comprises a coded binary decimal system of "one" bits and "zero" bits. The label scanner of the invention, in conjunction with the associated electronics, converts this encoded combination or groups of lines and spaces an array for one digit of which is shown at 41 in FIG. 2 into a sequence of electrical signals as the scanner raster lines scan across the bars and spaces of the coded label, as shown in FIGS. 5 and 6, and convert them to corresponding electrical pulses representing narrow and wide lines or spaces.

Figure 7:
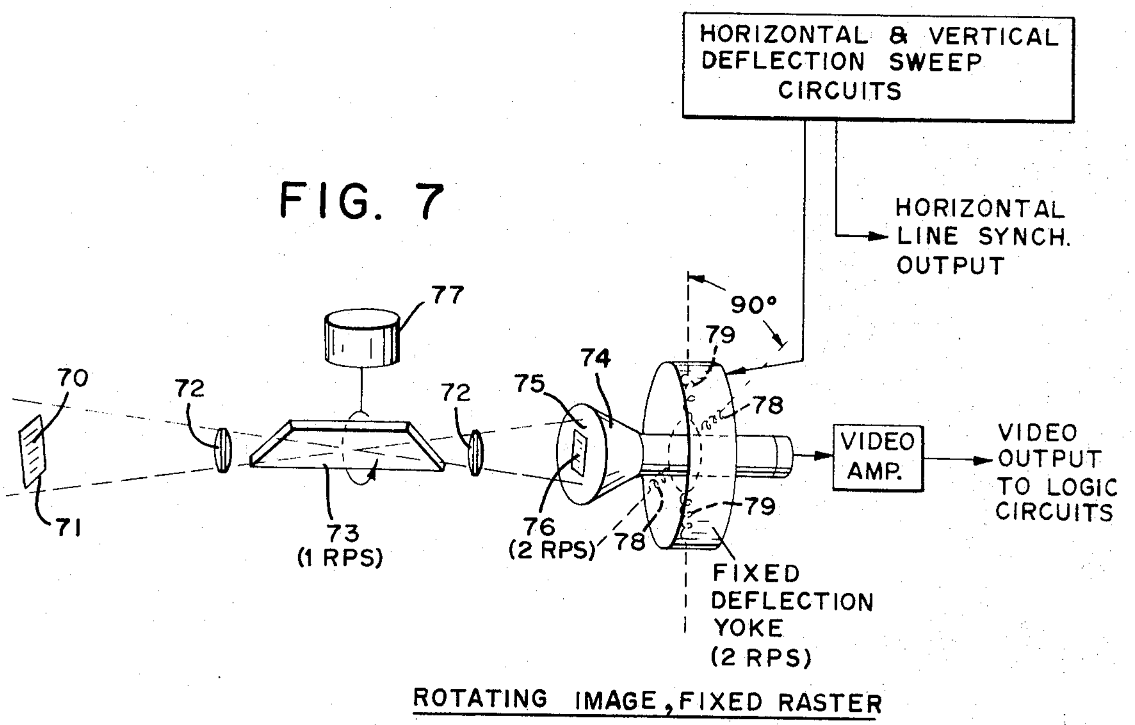
FIG. 7 is a block diagram which demonstrates how the image of an imprinted bar code can be optically rotated by mechanical means such that it will align itself parallel to the sweep lines of the raster which is traced on the target of the vidicon tube.

Although the RALS system in a specific embodiment incorporates a television-type vidicon tube, lens and various other components usually associated with a television camera, it will be understood that the RALS System does not pick up a picture image (in the normal sense) of the object which it scans; instead the RALS is made to scan linearly a bar code which has been printed on a label or package in much the same way that a hand-held optical pencil type scanner, such as that illustrated by FIG. 7 of said co-pending application, Ser. No. 146,044 and by FIGS. 6 and 7 of the co-pending U.S. Patent application of Berler et al., Ser. No. 58,762. However, while the hand-held reader is moved by hand while it is in contact with the coded strip thereby necessitating the presence of another attendant, the RALS unit of the present invention is operated automatically and remotely from a station located away from the object being scanned. The orientation of the coded strip with respect to the scanner is unimportant; this means that the operator does not have to be concerned with a requirement of aligning merchandise so that the coded labels all point in the same direction. The principle of operation of this advantageous self-orienting feature of the invention will now be described.

Figure 3:
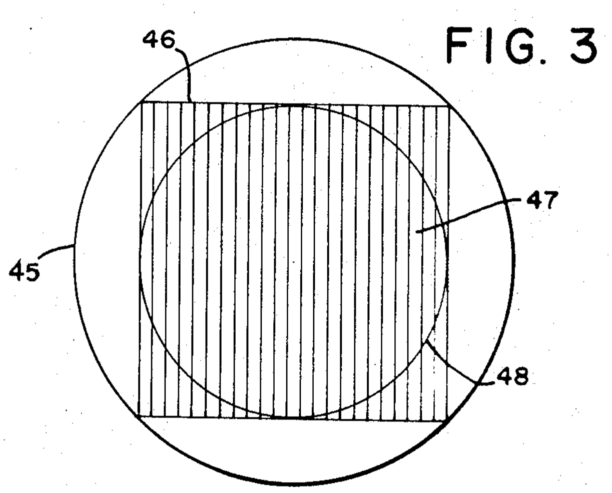
FIG. 3 represents the invisible path of the continuously moving electron beam spot on the target of a vidicon-type tube; the path is in the form of a square pattern of lines termed a raster.

For the purpose of providing a particular illustration, a circular area whose diameter of 10 inches, was chosen within which the scanning takes place. This 10-inch diameter circle 45 (FIG. 3), contains an inscribed square raster pattern 46 of 7.1 inches on a side. This 7.1 inches square represents the scanning area whose image will be focused onto the image scanning tube target. Since one of the requirements of the scanning system of the invention dictates that the label can be oriented in any direction, the raster lines 47 on the photosensitive target area or an image of the label focused on the target area is arranged so that it will rotate through 360° to enable the reading of codes which are decodable by scanning in one direction only. However, a rotation of 180° is necessary to assure a readout with codes which are devised to be scanned in either direction such as the code described in the aforementioned copending U.S. Patent application, Ser. No. 146,044. The present invention is described with reference primarily to a code which may be scanned in either direction. With an arrangement of this kind, if the coded label is positioned anywhere within a circle 48 whose diameter is 7.1 inches, regardless of its orientation, the scanner will function to decode and read out the information on the label into the associated computer system. The dimensions of the scanning raster are preferably chosen with the aim of placing a minimum burden on both the operator and the electronics. The seven-inch circle described in this illustration is of sufficient size to permit an operator to easily place the label which is attached to an article of merchandise within the circular area 48 in which the label can be scanned without having to be overly meticulous or precise in positioning the article, while at the same time keeping the image scanning tube line resolution within reasonable limits. As described in further detail hereafter, FIG. 3 illustrates a raster, which is sometimes called a frame or pattern, whose scanning lines are in a vertical position. The raster may be arranged to rotate in discrete steps or in a continuous manner.

Figure 4:
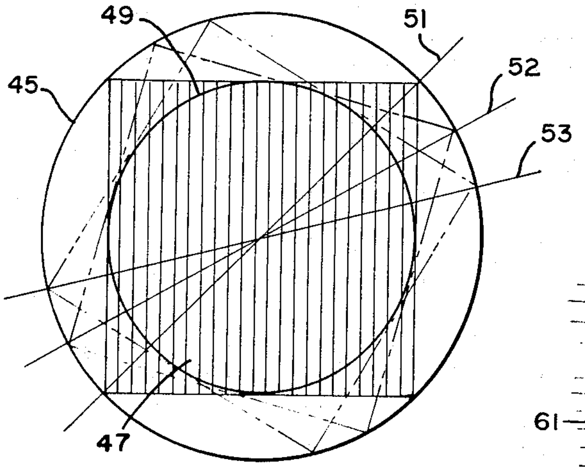
FIG. 4 depicts a representation of a rotatable raster at various positions in its rotary movement.

FIG. 4 illustrates how the raster appears as it rotates in discrete steps. Shown at 51, 52 and 53 are the diagonals of three different stationary rasters representing three steps. A complete compliment of prescribed scan lines must occur in a frame or raster. After the raster has effected a complete scan, for step 1 (raster position 51 in FIG. 4) then a new raster scan pattern will be generated in the oriented position represented by step 2 (raster position 52). After the raster of step 2 has been completed, a new raster scan orientation represented by step 3, (raster position 53 in FIG. 4) will be generated and scanned, and so on. Eventually, when the raster orientation has progressed 180°, the direction of the scan lines will be in the same alignment as they were at the start of step 1. The angular displacements of each step position, as well as the number of scan lines in each raster, will be determined by how many scans of the label are desired. In the present description, two complete scans across the coded strip are considered, the second serving as a check on, or verification of, the first. All numbers and dimensions are approximations and may be varied. As seen by reference to FIG. 4, when a coded label is placed within the 7-inch circular scanning area 49 at any position and in any orientation, the raster lines are eventually oriented in the proper direction so that at least two of the raster lines 56 and 57 scan linearly entirely through the entire coded strip 55, FIG. 5. It is seen from the foregoing that the decoding scheme of the invention is particularly adaptable to reading a linear printed code because the pattern of the raster scan itself is linear. Moreover, the scanning arrangement of the invention is uniquely reliable because the scan lines intersect the code bit lines and spaces perpendicularly thereby obviating the possibility of errors which have a greater tendency to occur in systems in which the scan lines are essentially parallel to the code bit lines. In the case of parallel bit and scan lines, the bit lines may be undetected between two scan lines or, because of partial coincidence with the scan lines, a blurred readout may result. As the raster scan lines pass through the printed indicia, the label, as described in each of the earlier mentioned copending U.S. Patent applications, Ser. Nos. 58,762 and 146,044, for example, is decoded in a manner similar to the electronic readout of a hand-held pencil type reader as it is drawn over the lines of a coded strip. The signal output from the image scanning tube is processed in a suitable manner, such as by logic circuits similar to those described in said copending U.S. patent applications, Ser. Nos. 58,762 and 146,044. As noted hereinabove, the purpose for using at least two scan lines is to insure that the readout is correct by checking one scan against the other.

It should be noted that the image scanning tube responds to light intensities that are reflected from the label surface. The photosensitive target in a vidicon tube, for example, responds to this light stimulation by generating electrical charges that are of a magnitude that is generally proportional to the intensity of the incident light quanta. Thus, in effect, an electrical charge "image" that corresponds to the optical image is generated and temporarily stored on the target. This charge image is read out or removed from the target by sweeping an electron beam over the target in a predetermined raster pattern. In the invention, this electron beam sweep pattern is represented by lines 47 (FIG. 3). In essence, as the beam sweeps over a discrete portion of the target, it completes an electrical circuit for that part of the raster, the beam current drawn from the portion of the target being related to the intensity of the illumination that initially generated the charge. Thus, as the beam sweeps along the coded pattern, a variable electrical signal is extracted that represents the fluctuations in light intensity registerd along the linear portion of the raster that is being swept. Since the operator must place the label within the 7-inch scan area, an easy and practical way of marking this area is by means of the projected 7-inch circle of light which also serves to illuminate the label although other means may be employed.

It will be understood that although the foregoing description is premised on an arrangement in which the raster is oriented with the code by rotation in discrete steps or positions in degrees, or fractions of a degree per step, the raster may be arranged advantageously to continuously rotate at some prescribed rate. The rate, when the raster rotates continuously, would be comparable to the rate of rotation of a raster rotating in incremental or discrete steps. In the case of continuously rotating rasters, the scan lines of the raster 47 would be curved instead of straight. The degree of curvature of these lines would depend upon the rate at which the raster is rotated in comparison to the sweep speed of the scan lines. If the width of the coded strip is narrow, its length long, and the scan line curved substantially, this would limit the number of sweep scans, i.e. the number of scan lines which traverse the coded strip without breaking out of the sides of the code on the label.

The following analysis, which is provided by way of illustration, is based on a label which has a bar line length of about five-sixteenths inch, i.e. the width of the coded column of printed lines is about five-sixteenths inch; such labels are available commercially. The length of such coded columns or strips may vary from about one-half inch to about 2½ inches or more. Labels with shorter coded strips and narrower widths may be used also. For example, the width of the code strip may be reduced to one-fourth inch and still have sufficient room on it for a minimum of two scan lines spaced one-tenth inch apart as illustrated generally by FIG. 5.

Based on a scan area of about 49 square inches, i.e. 7 inches to a side, and with a scan line separation of one-tenth inch (10 lines per inch), there would be 70 lines in the raster. This is not to be confused with horizontal line resolution which will be considered hereinbelow.

In the present illustration, it is assumed that the coded label is decodable in a maximum time of one-fourth second, that is, the merchandise must be placed in the scan area under the projected spot of light and the readout takes place in one quarter of a second or less. Since the scan lines of the rotating raster will realign themselves once every 180° for codes readable in both forward and reverse direction, this entire 180° rotation occurs in the one-fourth second time necessary for a readout. In addition, the raster which, in this example, rotates in steps, can make safe steps as large as 4° per step and still provide at least two or more scans, as shown by lines 56 and 57 (FIG. 5), through the length of the coded strip 55 of label 54 with the label located near the perimeter of the scan area as a worst case condition.

In the case where each frame rotation step is 4°, there will be 45 frames for a 180° raster rotation per one-fourth second or 180 frames per second for a 360° raster rotation. Since each raster has 70 scan lines, in 180 frames there will be $180 \times 70 = 12{,}600$ scan lines per second (12.6 KHz scan freq.) Thus, the raster will rotate and align itself in the same plane four times per second and the scan frequency will be 12.6 KHz.

The 12,600 cycle per second line scanning rate of the raster is not significantly different from the scanning rate of a standard television system. The standard television horizontal scanning frequency rate is 15,750 cycles per second. Thus, if the standard scanning rate of 15.75 KHz is used with 180 rasters or frames per second, each frame or raster will contain about 87 scan lines. Each line of the raster, when projected back out to the 7-inch square scanning area, is spaced about 0.08 inch apart. This may be viewed as an advantage since a coded array on the label need be no more than a two-tenths inch wide strip which would still have room for two complete scans on it. In a case where a coded digit density of ten to the inch is required on the label, the thinnest coded bar or space compatable with this digit density would be 0.008 inch in thickness for the scanner of this invention. It should be understood that the thinnest line or space printed can be either thicker or thinner than this dimension providing that all other bar and space thicknesses are increased or decreased in proportion. A change in line size will alter the digit density of the label. The digit density will decrease as the bar and space dimensions increase in thickness, or vice versa. There are practical limitations on how thin the line and spaces can be made in so far as printing techniques and image scanning tube line resolution is concerned.

For a label to be scanned remotely, the following analysis will illustrate the scanning tube line resolution required for reliable scanning when the thinnest line or space which is printed on the label is 0.008 inch. If a one inch length of label is printed with lines and spaces of 0.008 inch thickness, then 1 inch/0.008 = 125 lines of 0.008 inch thickness per inch. Half of this number would be black and the other half white. For 125 lines per inch, there would be 63 black lines and 62 white spaces. If the full field of view measures 7 inches square, then 125 lines per inch times 7 inches or a required resolution of 875 lines. This resolution must be available at the worst position of the field of view, which is at the corners. Since the resolution at the corners for a television camera is usually about seven/tenths of the resolution at the center, the resolution represented by the value $x$ in the formula below would have to have a minimum resolution of at least 1250 TV lines, i.e.

$$875/x = 0.7/1$$

$$0.7\ x = 875$$

$$x = 1250 \text{ lines}$$

The optical resolution of the lens system, ususally far exceeds the image scanning tube resolution and is not viewed as posing any difficulty.

In the case where digit density is 15 to the inch, the narrowest bar or space is 0.005 inch wide. This means that there are 1 inch/0.005 or 200 of these lines to the inch, or 1,400 lines in a 7 inch field of view scan area. It will be apparent that, although at some sacrifice in cost, a vidicon tube with 2,000 line resolution may also be used. Either the 1,200 line tube or 2,000 line tubes are available commercially.

In a situation where one-fourth second time for ticket scanning is considered to be too long, a period for the use to which the invention is applied, halving this time to one-eighth second would mean that the raster would rotate 1,440° or four times per second and the scan line frequency would then be doubled to 31.5 KHz for 180 frames per second. The lines per raster will remain the same. This is still a reasonable frequency.

Rotation of the image of the coded label so that its axis coincides with the orientation of the raster on the vidicon target may be effected by any suitable means recognized by those skilled in the art. In FIG. 7, for example, the image focused onto the vidicon target may be rotated optically by means of a rotating dove prism using a motorized drive. Alternatively, rotation of the vidicon raster may be effected by rotating an electromagnetic deflection coil yoke using a motorized drive. See FIG. 8. In this case, it is not necessary that the image rotation be faster than about twice per second. The former method of mechanically rotating the prism has the advantage that it does not require slip rings and sliding contacts to function. However, because of vidicon lag, some image smear may result. The latter method employing a rotating deflection coil avoids moving images and thus minimizes image smear as a consequence of the residual photo memory on the target; with the latter method, the image remains stationary while the direction of the beam sweep line deflection rotates. Moreover, the movement of slip rings and contacts at 2 rps does not introduce an objectionable rotation rate.

Figure 9:
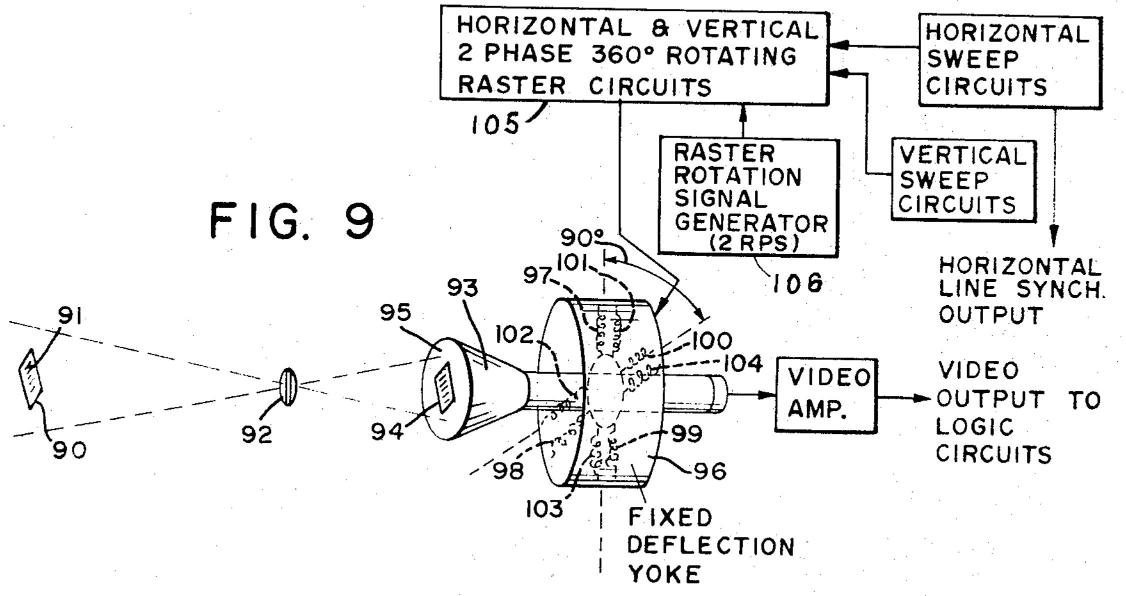
FIG. 9 illustrates still another embodiment wherein the image of an encoded label may be made to align itself parallel to the raster sweep lines by nonmechanical means, i.e. by a means in which no moving components are used.

Another mechanism which may be utilized to effect raster rotation is through the use of a two-phase or three-phase wave form on deflection plates or deflection coils in combination with the raster sweep waveforms as illustrated in FIG. 9 or by a combination of both. The embodiment of FIG. 9 is relatively complex since a linear square raster must also be deflected in a rotating manner. The linear sweep lines must maintain their 0.08 inch spacing along their full length, build up a square raster about 84 lines, allowing for sweep retrace, and then repeat this for each new direction of rotation of the raster. The lines of the raster must all sweep at the same linear speed.

An important advantage of the automatic label scanning system of the invention resides in the fact that because the line scan frequency which produces the raster is so high (15.75 KHz), no electronic counters have to be used to measure bar widths, a mechanism which is necessary with hand-held optical pencil readers whose rate of scanning varies as the operator draws the reader over the code and counters enable an adjacent bar and space to be compared against each other by the count accumulated for each. In the system of the present invention, the scan rate is relatively very rapid and constant. Thus pulse widths produced as a result of bar or space widths will be compared directly in the electronic circuits where they will be assigned one and zero bits of the binary code.

Another important advantage of the raster type scan of the present invention resides in the circumstance that all scan lines in the raster are parallel to each other; and since they are generated sequentially, a ticket or label with more than one coded strip printed on it may be read out essentially during the same time interval. Thus, very high digit densities are possible. This is illustrated by reference to FIG. 6 wherein a label 60 with two coded strips 61 and 62 is shown each with two raster lines 64 and 65 scanning one coded strip 61, and 67 and 68 respectively scanning the other coded strip 62. Each line of code has its own start-stop recognition code so that the two strips of code and their numbers can be properly identified in sequence.

Because the raster lines become realigned at intervals of every 180° of raster rotation, and since the labels can be read either forward or backwards, it is this fact which makes possible a label readout at every 180° of raster rotation. The forward or reverse reading of the linear code is readily accomplished by the binary code format which is arranged to include a recognition at the start of a forward or reverse reading of the code, i.e. to produce one series of impulses in one direction and a different series when the code is scanned in the opposite direction. The differences referred to as the start-stop code are recognized in the logic of the associated computer which processes the scan impulses and produces the proper readout irrespective of the scan direction. Thus, independently of the direction of scanning, the detected code is converted in the logic and recorded in the proper sequence. Of course, on reading a code in which forward and backward scanning is not provided for, instead of obtaining a reading at least each 180° of rotation, a readout would be assured only upon 360° of rotation when the raster and the forward orientation of the code coincide.

In positioning the remote automatic label scanner of the invention, it will be apparent that its distance away from the label to be decoded may be varied depending on the focal length of the lens employed. For example, if the scanning unit is placed seven feet above a checkout counter, the following trigonometric calculation may be used to determine the lens field of view angle necessary to encompass a 7-inch diameter field.

$$\tan \phi/2 = 3.5 \text{ inch}/84 \text{ inches} = 0.04166$$

$$\tan \phi/2 = 2.4^\circ$$

$$\tan \phi = 2.4 \times 2 = 4.8^\circ$$

Wherein $\phi$ is the field of view angle of the lens required for this distance to the viewing area. Therefore, the lens field angle should be about 5° wide. Similarly, for other distances, other lenses with different fields of views can be used.

FIG. 7 is a simplified block diagram of a system employing a vidicon tube and shows a method which may be used to align the image of a randomly oriented label having a bar code 70 imprinted on it so that the axis of the bar code coincides with the sweep lines of the raster being traced on the target of the vidicon tube.

The label 71 is imaged into the vidicon tube 74 through lenses 72 so that it is made to impinge upon the target area 75. The light rays of the image pass through the dove prism 73 before the image is formed on the target. A motorized rotator mechanism 77 rotates the dove prism about its optical axis which in turn causes the optical image 76 to rotate as it is being imaged upon the target. For each 360° rotation of the dove prism, the image will rotate 720° or two times as fast as the rotational rate of the dove prism. The deflection yoke assembly consists of a pair of horizontal deflection coils 78 and a pair of vertical deflection coils 79; the magnetic axis of each pair of coils being arranged to be perpendicular to each other. This arrangement causes the electron beam in the vidicon tube to trace out a pattern of sweep lines on the target area when they are energized with the proper wave form currents which originate in the horizontal and vertical deflection sweep circuits. The electrical signal output from the image scanning vidicon tube 74 is amplified and shaped in the video amplifier where it is then passed on and introduced into the appropriate logic circuitry where the label is decoded.

By use of appropriate logic, the scanner of the present invention may be arranged so as to read out similar types of single color printed bar codes. This includes not only bar codes of the kind shown in FIG. 2 and in the co-pending applications, Ser. No. 58,762 and Ser. No. 146,044 and in U.S. Pat. No. 3,359,405 but also circular or bullseye or target type printed codes such as the kind disclosed in U.S. Pats. Nos. 2,612,994 and 3,622,758 in which bar (including circles) or space or both vary in thickness. In all such codes, reading may be effected without regard to code array orientation. In the concentric circle or target-type code read out is effected when one or more scan lines of the raster sweeps through the concentric lines (circles) and spaces including the center or bulls-eye.

By method described in connection with FIG. 7, the image of a randomly oriented code imprinted label is made to align itself in a manner such that some of the sweep lines of the raster will traverse through the complete length of the bar code from start to finish by means of a mechanically moving optical component such as the dove prism. The deflection yoke remains in a stationary position.

Figure 8:
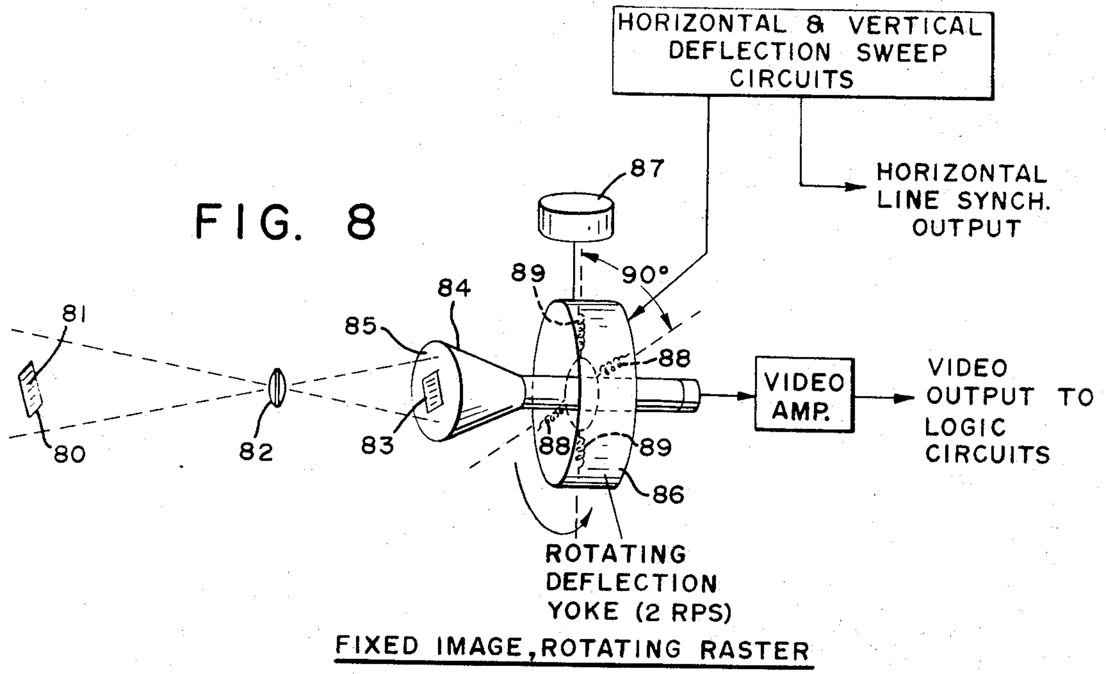
FIG. 8 illustrates an alternate embodiment in which the image of an imprinted coded label may be aligned so that it will be parallel to the sweep lines of the raster traced on the image scanning tube target. In this embodiment, the image of the label remains fixed while the raster is made to rotate until its sweep lines are parallel to the image of the coded label; rotation of the raster being accomplished by mechanically rotating the deflection yoke.

FIG. 8 is a block diagram of an alternate method of aligning a randomly oriented label 80 and its imprinted bar code 81 with the sweep lines of the raster in the image scanning tube 84. In this arrangement, label 80 is imaged at 83 through lens 82 onto the photosensitive target 85 of the tube 84. The deflection coil yoke 86 is rotated about the axis of the image scanning tube 84 by the yoke rotator motor assembly 87. The horizontal and vertical deflection sweep circuits supply waveform currents to the horizontal and vertical deflection coils 88 and 89 respectively of the yoke through slip ring contacts (not shown) thus causing the electron beam of the image scanning tube to trace out invisible sweep lines in the form of a raster on the target area 85. Since the deflection coil yoke 86 rotates symmetrically about the tube axis, the resulting raster will also rotate about the center of the target area forming an invisible rotating sweep pattern resembling the illustration represented by FIG. 4. However, instead of the progressive discrete steps 51, 52 and 53, a continuous rotary motion is produced. The yoke 86 is made to rotate at a rate of 2 rotations per second (RPS) and, therefore, the raster will also rotate at the same rate of 2 RPS. The output signal of the image scanning tube is amplified and shaped in the video amplifier. After being so processed, the resulting electrical signal is then introduced into an appropriate logic circuitry where it is decoded. In the embodiment of FIG. 8, the randomly oriented image of the bar code remains fixed in one position on the target while the raster traced on the target is made to rotate. When the orientation of the raster sweep lines and the bar code are parallel to each other, some (e.g. preferably at least two) of the raster sweep lines will then traverse completely through the entire bar code, producing a readout. The image in this embodiment remains stationary while the raster rotates.

FIG. 9 illustrates still another method of accomplishing raster sweep alignment (i.e. orientation for reading) of the image scanning tube with the image of the coded strip printed on a label which may be randomly oriented. The method of FIG. 9 has the advantage of requiring no optical or mechanical moving parts. In FIG. 9, label 90 is focused by lens 92 onto the image scanning tube target 95 where it forms an image of the label 94. A deflection coil yoke 96 which remains in a fixed position is concentrically mounted about the image scanning tube 93. In this embodiment, the yoke contains two sets of deflection coils each set containing four coils. The first set contains coils 97, 98, 99, and 100 and the second set contains coils 101, 102, 103, and 104. Each set of four coils are arranged so that two coils of one set have a common magnetic axis as do the other two coils of the same set. The magnetic axis of one pair of coils, however, is displaced by 90° from the magnetic axis of the other pair of coils in the same set. The second set of four deflection coils is arranged in the same manner. Thus, the magnetic axis of coils 97 and 99 of one set is perpendicular to the magnetic axis of coils 98 and 100 of the same set. Also, coils 101 and 103 have a common magnetic axis which is perpendicular to the magnetic axis of coils 102 and 104 of the second set of deflection coils.

Each set of deflection coils are supplied with a different 2-phase AC current waveform. The combination of these two waveforms enable a suitable raster pattern to be traced by the electron beam on the target in the tube 93. The two AC sweep waveforms are each generated in the horizontal sweep circuits and vertical sweep circuits. The first waveform has a frequency of 15,750 Hz and the second waveform has a frequency of 180 Hz. Hereafter, the 15,750 Hz frequency will be referred to as the horizontal sweep and the 180 Hz frequency will be referred to as the vertical sweep. This reference to horizontal sweep and vertical sweep has no relationship to attitudes referenced to earth but is used to designate a fast sweep axis which is displaced by 90° from the slow sweep axis such as is used in a television system. For example, in the instant invention, the horizontal sweep waveform may be impressed across coils 97 and 99 of the first set and the vertical sweep waveform impressed across coils 102 and 104 of the second set. The magnetic axis of coils 97 and 99 in the first deflection coil set is perpendicular to the magnetic axis of coils 102 and 104 in the second deflection coil set. Thus, there will be approximately 84 horizontal sweeps for one vertical sweep traced by the beam on the target which allows time for sweep retrace. In progressing further, the horizontal sweep waveform is impressed across coils 98 and 100 of the first deflection coil set and the vertical sweep waveform is impressed across coils 101 and 103 of the second deflection coil set. Again, there will be approximately 84 horizontal sweeps for one vertical sweep traced on the target by the electron beam. However, the direction of the horizontal sweeps traced on the target will now be displaced by 90° from their original direction. Thus, by arranging the phase and amplitude of the sweep waveform impressed across individual coils in each deflection coil set, the raster traced by the electron beam on the target can be made to rotate about itself in a step-by-step manner or in a continuously rotating manner. The horizontal and vertical raster sweep currents are generated at 105 in the form of 2-phase waveforms. The amplitude, as well as the phase, of each of these waveforms is modified in appropriate electronic circuitry as at 105, such as by the introduction of the 2 Hz raster rotation control signal from generator 106, by methods well known to those skilled in the state of the art.

As briefly noted hereinabove, a 3-phase waveform may be used in another arrangement for both the horizontal and vertical sweep currents. In this case, each deflection coil set will have three individual coils arranged to have a 120 degree displacement between each of them, in the shape of a Y. As with the 2-phase system described above in detail, when the phase and amplitudes of the 3-phase system is properly controlled, a rotating raster is produced. The principle of operation for the 3-phase system is otherwise similar to the 2-phase system.

As described in connection with FIG. 7 and FIG. 8, once the raster sweep line direction is made to coincide with the image axis of the coded strip 91 on the label, the code may be detected and read out. The output signal from the image scanning tube is amplified and shaped by the video amplifier. The output of this amplifier is then introduced into the appropriate logic circuitry to decode the label.

It will be apparent that more than one scanner of the kind provided by the invention may be used at different locations, i.e. at each of a plurality of points of sale checkout counters, and serviced by a single electronics system thereby avoiding the cost of multiple units. However, when more than one scanner is combined in this manner, the time required to read out a label is extended. For instance, in the case where a single scanner gives a label readout in one-eighth second, two scanners multiplexed into a common electronics system require a minimum time of one-fourth second each for a readout. This time interval may be reduced by having each remote automatic label scanner output enter a memory bank and then multiplexing each memory.

The lens system used in the scanner of the invention should be stopped down to a small aperture and the illuminating light level should be high so that a large depth of field is available. Preferably, for example, when the scanner is positioned over the checkout counter, the depth of field should allow a label to remain in acceptable focus from the counter level up to a height of a least twelve inches or more. Of course, stopping down the lens means restricting the light entering the vidicon tube. A compromise must be arrived at between the aperture used and the brightness of the spot of light necessary. A 7-inch diameter projected bright spot of light is possible at a distance of seven feet or less while at the same time allowing a reasonable lifetime for the projection lamp.

Although a vidicon type image scanning tube has been referred to in describing the invention in detail hereinabove, it will be understood that the invention is not to be construed as limited to this particular type of tube. Other types of known image scanning tubes which use similar deflection techniques and optics may be substituted in providing automatic label scanning within the contemplation of the invention. Illustrative of other known photosensitive tubes which may be substituted are image orthicon tapes, image dissector tubes, and the like. Tubes of this kind are described, for example, in *Handbook of Reference Data for Radio Engineers*, International Telephone and Telephone Corp., 4th Edition, American Book-Stratford Press, Inc., New York, N.Y., pp. 410–424, 1956.

Thus, the scanning system of the invention may substitute instead of a vidicon type tube an image orthicon tube whereby the output from the tube, subsequently introduced into a conversion circuit may be used. Alternately, an image dissector type tube may likewise be substituted in the system. In the image dissector tube an optical image is focused on a photo cathode area and produces an equivalent electron image which is scanned by a raster type sweep pattern to provide image sampling whereby the variation in electrons resulting from the line and space indicia is amplified in an electron multiplier and its output introduced into appropriate logic circuitry.

It is apparent from the foregoing description, that a variety of highly practical merchandising and inventory control procedure may be implemented with this type of scanner. For example, manufacturers of various types of items may agree to assign standardized identifying numbers to each and every type of product, these identifying numbers may be printed or lithographed in code form on some part of the product package or label. SUch code, if desired, may even be disguised as a part of a design in the label or printed along a border. When thus applied, no human readable numbers need be printed along with the code. This code part or item number may be used at the manufacturing source, or warehouse for manufacturer or distributor records, retention purposes, and/or by the supermarket, for stock or inventory control. Also, if desired, a coded number may be printed on some part of the label as a portion of the art work in addition to the code. Thus, for example, if a brand name product such as catsup had a certain coded item number for a particular size bottle, this number would be printed on the label at the source. Then, regardless of which chain of stores (or individual market) the manufactured item is shipped to, this coded number would identify the same item and manufacturer to any concern which handles this product. As a further example, a product such as a small can of peaches would have a different coded number and a larger can of the same product would be distinguished by still another coded number. Incoming and outgoing stocks of every type of product could then be automatically scanned for stock inventory control, for reordering, etc. This coded number identifying the specific part could be separate from the normal customer price label or it might be combined with it as desired. Also, if desired, the coded number may be used for price retrieval. Generally, the customer is concerned only with the price so that human readable price information may be printed with its code for the customers' use, while the other information for inventory or other control use not of concern to the customer, e.g. the part number, may be represented by code only, with no human readable numbers printed.

While the invention has been described in connection with its utilization in conjunction with a customer checkout counter, application to that function is illustrative only. It will be readily apparent to one skilled in the art that the invention may be adapted to a variety of other purposes. For example, it may find utility in processing zip coded mail. Accordingly, it will be understood that although the invention has been described with various details in order to afford the necessary particulars for a full understanding, various changes in the details of construction, operation, and field of use will be apparent to one skilled in the art;

such changes are not to be necessarily construed as departing from the spirit of the invention except to the extent required by the limitations expressed in the claims.

I claim:

1. A coded mark sensing system for automatically reading randomly oriented encoded indicia in the form of printed (marks) spaced lines comprising an electronic image scanning tube having a photo sensitive area upon which an optical image is focused and scanned with a raster type sweep pattern to provide electrical sampling of the optical image, a lens system on said scanner to focus the optical image of said lines onto said photo sensitive area in said image scanning tube, means to carry the encoded indicia for sensing, within view of the scanning tube to stimulate said photo sensitive portion of said scanner, means operative to automatically orient said raster scanning pattern with the image of the printed (marks) lines by continuously rotating the image of said coded indicia relative to said raster scanning pattern in order to produce an output signal that corresponds to said indicia, means for converting said output signal into binary coded signals and means for converting said binary coded signals into recognizable symbols.

2. The system of claim 1 wherein the electronic image scanning tube is a vidicon type tube.

3. The system of claim 1 wherein the electronic image scanning tube is an image orthicon type tube.

4. The system of claim 1 wherein the electronic image scanning tube is an image dissector type tube.

5. The system of claim 1 wherein the image tube scanner is located at a position remote from said coded indicia.

6. The system of claim 1 employed in conjunction with a retail merchandise checkout counter wherein the means to carry the spaced lines for sensing comprises labels affixed to the articles of merchandise said merchandise being transported so that the coded label thereon is carried within view of said scanner.

7. The system of claim 6 wherein the label scanner is situated above a checkout counter over which articles of merchandise are transported.

8. The system of claim 6 wherein the label scanner is situated below a conveying surface over which said merchandise is transported, said surface having a viewing window through which labels affixed to the bottom of merchandise may be viewed from below.

9. The system of claim 6 wherein the label scanner is positioned to one side of said checkout counter over which articles of merchandise are transported and positioned so as to sense a coded label affixed on one side of said merchandise.

10. The system of claim 6 wherein said scanner is multiplexed in combination with at least one other scanner at a different checkout station or counter so that only a single readout per labelled article of merchandise occurs at a checkout station in which said scanner is positioned.

11. Apparatus for reading printed coded indicia in the form of lines and spaces comprising in combination a scanner wherein a photo sensitive target area is scanned by a raster type sweeping pattern, means to rotate continuously the optical image of the coded indicia relative to the raster sweeping pattern, electronic means to scan the image of said coded indicia which is positioned within view of said scanner and focused onto the photo sensitive area, means to produce electrical output signal impulses which correspond to said coded indicia that are produced by said scanning action, and means for converting said output signals into predetermined intelligible symbols.

12. The apparatus of claim 11 wherein orientation of the raster pattern with the optical image of the coded indicia is affected by rotating the scan pattern.

13. The apparatus of claim 11 wherein the orientation of the raster pattern with the optical image of the coded indicia is effected by rotating the optical image.

14. A system for converting encoded indicia into intelligent data comprising an image scanning tube which has a photo sensitive area upon which an optical image of the encoded data is focused, electronic means functioning to scan said photo sensitive area with a raster type sweep pattern to provide optical image sampling, a label having encoded indicia in the form of printed lines and spaces which are representative of a binary code, means to automatically provide relative and continuous rotation between said sweeping raster pattern and the optical image to cause registration of label indicia with the sweeping scan lines of the raster pattern and thereby to produce electrical output signals corresponding to said indicia, and means for converting said output signals into intelligible symbols.

15. The system of claim 14 wherein said means for orienting said raster sweeping pattern with said encoded indicia comprises a motorized rotating dove prism through which light rays of said encoded indicia are transmitted.

16. The system of claim 14 wherein said means for orienting said sweeping raster pattern with said encoded indicia comprises means for mechanically rotating the deflection yoke of the image scanning tube.

17. The system of claim 14 wherein said means for orienting said sweeping raster pattern with said encoded indicia includes in combination a yoke of said image scanning tube with two sets of deflection coils to generate a rotating raster type sweep pattern as a result of two-phase waveform currents applied to each set of the deflection coils.

18. The system of claim 14 wherein said encoded indicia is scanned by at least two sweeps of said raster pattern.

19. The system of claim 14 wherein said label comprises a plurality of distinct encoded indicia which are essentially simultaneously scanned by said raster sweeping pattern.

20. A method for converting printed encoded indicia, which is formed of lines and spaces and is randomly oriented with respect to the scanner, into intelligent data which comprises passing said encoded indicia within view of an image scanning tube which has a photo sensitive area upon which an image of said coded indicia is formed, scanning said photo sensitive area with a raster sweeping pattern, orienting said raster sweeping pattern with the randomly oriented encoded indicia by providing automatic relative continuous rotation between the coded indicia image and the raster scan pattern and thereby effecting registration between the image focused on the photo sensitive area of the tube and the raster pattern, and converting the electrical signals from the scanning of said image into intelligible symbols.

21. The method of claim 20 wherein the coded indicia comprises a linear array of printed lines and spaces of predetermined thicknesses and wherein the readout is effected as said lines and spaces which comprise the coded indicia are intersected substantially perpendicularly by said scan lines.

22. The method of claim 20 wherein the coded indicia comprises a concentric array of printed lines and spaces of predetermined thicknesses and wherein the readout is effected when one or more scan lines of the raster sweeps diametrically through said concentric array of lines and spaces.

* * * * *